United States Patent [19]

Lytle et al.

[11] Patent Number: 5,422,240

[45] Date of Patent: Jun. 6, 1995

[54] APPARATUS AND METHOD FOR TESTING CONDOMS AS BARRIERS TO VIRUS PENETRATION

[75] Inventors: Carl D. Lytle, Laytonsville, Md.; W. Howard Cyr, Arlington, Va.

[73] Assignee: The United States of America as represented by the Department of Health and Human Services, Washington, D.C.

[21] Appl. No.: 915,581

[22] Filed: Jul. 20, 1992

[51] Int. Cl.$^6$ ............................ C12Q 1/70; C12M 1/34
[52] U.S. Cl. ........................................ 435/5; 435/291; 435/810; 73/38; 73/45.5
[58] Field of Search ................... 435/5, 287, 291, 311, 435/316, 810; 422/99; 73/38, 40, 41.2, 45.5

[56] References Cited

U.S. PATENT DOCUMENTS

| | | | |
|---|---|---|---|
| 4,843,014 | 6/1989 | Curier | 436/63 |
| 5,050,428 | 9/1991 | Torres-Ibanez | 73/45.5 |
| 5,073,482 | 12/1991 | Goldstein | 435/5 |
| 5,138,871 | 8/1992 | Retta et al. | 73/38 |

OTHER PUBLICATIONS

Lytle, et al., "Virus Leakage Thrugh Natural Membrane Condoms", Sexually Transmitted Diseases, vol. 17, No. 2, Apr.–Jun. 1990, pp. 58–62.

Lytle, et al., "Important Factors for Testing Barrier Materials with Surrogate Viruses", Applied and Environmental Microbiology, vol. 57, No. 9, Sep. 1991, pp. 2549–2554.

Retta, et al., "Test Method for Evaluating the Permeability of Intact Prophylatics to Viral-Size Microspheres Under Simulated Physiologic Conditions", Sexually Transmitted Diseases, Apr.–Jun. 1991 vol. 18, No. 2, pp. 111–118.

F. N. Judson, "Effectiveness of Condoms for Prevention of HIV Infections", AIDS Updates, vol. 2, No. 6, Nov./Dec. 1989, pp. 1–8.

M. A. Conant, et al., "Herpes Simplex Virus Transmission: Condom Studies", Sexually Transmitted Diseases, vol. II(2), Apr.–Jun. 1984, pp. 94–95.

S. Katznelson, et al., "Efficacy of the Condom as a Barrier to the Transmission of Cytomegalovirus", The J. of Infectious Diseases, vol. 150, No. 1, Jul. 1984, pp. 155–157.

M. A. Conant, "Condoms and the Prevention of AIDS", JAMA, vol. 256, No. 11, 1985.

M. A. Conant, "Condoms Prevent Transmission of AIDS-Associated Retrovirus", JAMA, vol. 255, No. 13, Apr., 1986, p. 1706.

P. Van de Perre, et al., "The Latex Condom, An Efficient Barrier Against Sexual Transmission of AIDS-Related Viruses", Gower Academic Journals Ltd., vol. 1, No. 1, 1987, pp. 49–52.

(List continued on next page.)

Primary Examiner—William H. Beisner
Attorney, Agent, or Firm—Lowe, Price, LeBlanc & Becker

[57] ABSTRACT

A method for testing a condom for viral penetration includes the steps of positioning a condom to be tested in a restraining device so that expansion of the condom is restricted to a size corresponding to the device anthropomorphic dimensions of a penis; pressurizing the condom via a liquid containing viral particles in suspension, and monitoring for passage of viral particles through the condom. The method which simulates conditions of human sexual intercourse while using a viral particle to test condom integrity can be effected using an apparatus with elements that are commonly found in a microbiology lab. The apparatus includes a conduit over which the open end of the condom to be tested is secured; a restrainer for restricting the expansion of the condom to a size corresponding to the mean anthropomorphic dimensions of a penis; a liquid containing viral particles in suspension, the liquid filling the condom; a pressurizing device for pressurizing the condom via the liquid; and a container filled with a collecting fluid wherein the condom and the restrainer are positioned so that the viral particles that have passed through the condom can be monitored.

35 Claims, 2 Drawing Sheets

OTHER PUBLICATIONS

G. Y. Minuk, et al., "Condoms and Hepatitis B. Virus Infection", Annals of Internal Medicine, vol. 104, No. 4, Apr. 1986, p. 584.

S. M. Scesney, et al., "The Impermeability of Condoms to Human Immunodeficiency Virus (HIV) and Inactivation of HIV by the Spermicide Nonoxynol-9", Dept. of Pediatrics and Department of Medicine, University of Massachusetts Medical Center, 1987.

G. Y. Minuk, et al., "Efficacy of Commercial Condoms in the Prevention of Hepatitis B Virus Infection", Gastroenterology, vol. 93, No. 4, 1987, pp. 710-714.

C. A. Rietmeijer, et al., "Condoms as Physical and Chemical Barriers Against Human Immunodeficiency Virus", JAMA, vol. 259, No. 12, Mar., 1988, pp. 1851-1853.

B. Voeller, et al., "Strength Comparison of Extra Strength Condoms from Two Manufactures", Mariposa Occasional Paper #15, Jan. 1990, pp. 2-9.

S. M. Retta, et al., "A Permeability Study of Latex and Natural Membrane Condoms", Office of Science and Technology Center for Devices and Radiologic Health, Food and Drug Administration, 1988.

B. Voeller, et al., "Gas, Dye, and Viral Transport Through Polyurethane Condoms", JAMA, vol. 266, No. 21, 1991.

R. F. Carey, et al., "Effectiveness of Latex Condoms as a Barrier to Human Immunodeficiency Virus-sized Particles Under Conditions of Simulated Use", Sexually Transmitted Diseases, vol. 19, No. 4, Jul./Aug., 1992, pp. 230-234.

D. Beytout, et al., "A Simple and Rapid Methods to Test the Permeability of Condoms to Viruses", La Presse Medicale, vol. 18, No. 33, Oct., 1988, pp. 1651-1653.

B. Voeller, et al., Mariposa Foundation Report, pp. 1-5.

Database WPI, Section Ch, Week 8740, Derwent Publications Ltd., London, GB; Class D05, AN 87-283166 & SU,A,1 295 249 (Gnatchenko II) 7 Mar. 1987.

APPARATUS AND METHOD FOR TESTING CONDOMS AS BARRIERS TO VIRUS PENETRATION

BACKGROUND OF THE INVENTION

The invention relates in general to an apparatus and method for testing condoms, and in particular to an apparatus and method for testing condoms as barriers to virus penetration.

The use of contraceptive condoms to prevent the transmission of disease during sexual intercourse has attained new urgency since acquired immune deficiency syndrome (AIDS) has become known. This has raised important questions as to the effectiveness of various condom materials as barriers to viruses, including the human immunodeficiency virus-1 (HIV-1) which is considered the causative agent of AIDS. One of the factors affecting the overall ability of condoms to control the transmission of AIDS and other sexually transmitted diseases is the integrity of the barrier material.

Retta et al. ("Test Method for Evaluating the Permeability of Intact Prophylactics to Viral-Size Microspheres Under Simulated Physiologic Conditions", *Sexually Transmitted Diseases*, April–June 1991, Vol. 18, No. 2) disclose a test method for evaluating the barrier effectiveness of a condom subjected to simulated physiologic conditions. One of the problems with the Retta method arises from the use, as a substitute for a virus, of a fluorescent polystyrene microsphere, which is a biologically irrelevant and unstable particle. The polystyrene microspheres often break into pieces during the test. Therefore, measured data concerning the size of particles penetrating the condom is practically meaningless. Additionally, it is unclear how the measured barrier effectiveness of a condom to a polystyrene microsphere or pieces of a microsphere correlates with the barrier effectiveness of a condom to a virus.

Another problem with the Retta method is its complexity and the expense of the test apparatus for implementing it. The Retta method uses specially designed components which are not commercially available. Furthermore, in a biologic test system, after a condom is tested, the testing system must be sterilized or a new testing system provided before another condom is tested. In the Retta method, the test components are relatively expensive and therefore uneconomical to replace after each test. Also, the materials used for the components of the Retta test method are not readily sterilizable. Therefore, the Retta method is not adaptable to testing condoms for viral penetrability using a virus in the test method.

Lytle et al. ("Virus Leakage Through Natural Membrane Condoms", *Sexually Transmitted Diseases*, April–June 1990, Vol. 17, No.2) disclose a method for determining virus leakage through natural membrane condoms. In this method, there are several problems. First, the method does not test the entire useable condom surface. Second, the method does not employ physiological pressure. Therefore, the results are not useable for risk assessment.

Other prior art methods using viruses do not have any control over or knowledge of the pressure, nor do they test the entire useable surface of the condom. Therefore, the results of those methods are not interpretable or useable for risk assessment.

SUMMARY OF THE INVENTION

It is an object of the present invention to provide an apparatus for testing a condom that uses a biologic test particle and simulates conditions of human sexual intercourse.

It is another object of the present invention to provide an apparatus for testing a condom that is inexpensive and comprises elements commonly found in a microbiology lab.

It is a further object of the present invention to provide a method for testing a condom for viral penetration which simulates conditions of human sexual intercourse.

It is a still further object of the present invention to provide a method for testing a condom for viral penetration that is simple to use, while providing meaningful data.

It is yet a further object of the present invention to provide an apparatus in the form of a kit for testing a condom for viral penetrability that is inexpensive and simple to use.

These and other objects and advantages of the invention are realized by a method for testing a condom for viral penetration, comprising the steps of positioning a condom in a restraining means for restricting hydrostatic expansion of the condom to a size corresponding to mean anthropomorphic dimensions of a penis; pressurizing the condom by introducing thereinto a liquid that contains viral particles in suspension; and monitoring for passage of any viral particles through the condom.

The method of the invention is effected by an apparatus comprising a condom to be tested, the condom having an open end; a conduit having a first end, the open end of the condom being placed over the first end of the conduit; a means for securing the open end of the condom over the first end; a restraining means for restricting hydrostatic expansion of the condom to a size corresponding to mean anthropomorphic dimensions of a penis, the restraining means having an open end and being virally penetrable and virally inert, wherein the restraining means is positioned relative to the condom such that the restraining means envelopes a portion of the condom; a liquid containing viral particles in suspension, the liquid filling the condom; a means for pressurizing the liquid; a container capable of holding liquid, wherein the condom and the restraining means are positioned in the container; and a collection fluid in the container for collecting the viral particles that have passed through the condom.

The present invention further includes an apparatus in the form of a kit for testing a condom having an open end for viral penetrability, comprising a conduit having first and second ends, the first end of the conduit for receiving the open end of the condom; a means for securing the open end of the condom over the first end; a restraining means for restricting hydrostatic expansion of the condom to a size corresponding to mean anthropomorphic dimensions of a penis, the restraining means having an open end and being virally penetrable and virally inert, wherein the restraining means is to be positioned relative to the condom such that the restraining means envelopes a portion of the condom; at least one viral particle; a first dried buffer powder for mixing with water and for suspending therein the at least one viral particle; a container capable of holding liquid, wherein the condom and the restraining means are to be positioned in the container; and a second dried buffer powder for mixing with water and collecting the viral particles that have passed through the condom.

BRIEF DESCRIPTION OF THE DRAWINGS

The attached drawings are hereby expressly made a part of the specification.

DETAILED DESCRIPTION OF THE PREFERRED EMBODIMENTS

The present invention is directed to an apparatus and method for testing the effectiveness of condoms as barriers to virus penetration. The inventive method more closely simulates conditions of human sexual intercourse with controlled test conditions and actual virus transmission through a condom than any method previously used. Therefore, the results of this method are particularly meaningful and readily interpreted. Furthermore, the simplicity of the method and the lack of necessity for sterile test samples make possible its widespread use. The method of the invention can be effected using an apparatus which is simple, inexpensive, and uses components readily available in most microbiology laboratories. The method does not require the use of expensive custom-made components. The present invention further encompasses an apparatus in the form of a kit for testing a condom for viral penetrability. The kit is relatively inexpensive and simple to use.

Figure 2:
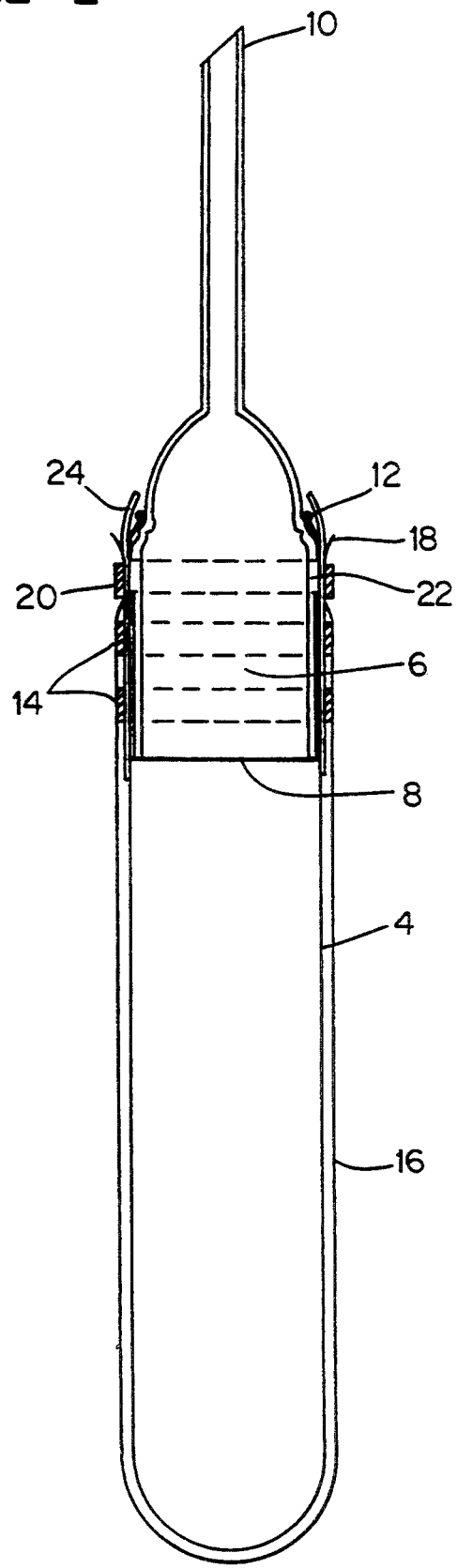
FIG. 2 is an enlarged view of the relationship between the conduit, condom, and restrainer.

With reference first to FIG. 2, the apparatus of the present invention includes a condom 4 to be tested, the condom 4 having an open end 12. The open end 12 of the condom 4 is placed over a first end 8 of a conduit 6. The conduit 6 may be made of glass, ceramic, or a sterilizable plastic, that is, any material which is inexpensive and easily sterilized, as in an autoclave. In the preferred embodiment, the conduit 6 is a 30 ml glass Buchner funnel (with fritted disc removed). The open end 12 of the condom 4 is secured over the first end 8 of the conduit 6 by means 14 for securing. The securing means 14 is preferably two rubber bands (6 mm wide, 180 mm circumference, 1 mm thick) that are tightly wrapped over the means 24 for protecting to hold the condom in place on the conduit and provide a water tight seal. However, the means 14 for securing may be a clamp, a flared end of the conduit 6, or any other means for securing the open end of the condom to the conduit so that the liquid in the condom does not leak out.

Although not necessary to the present invention, a means for protecting 24 can be placed over the open end 12 of the condom to protect the condom from abrasion when the means 14 for securing is positioned. The means for protecting 24 can be parafilm, wax paper, an ordinary kitchen plastic such as Saran wrap, or a similar material.

While not critical to the inventive apparatus, it is convenient to provide a leakage indicator 22. When the condom to be tested is not lubricated, or when the lubrication has been removed by rinsing and then drying the condom, the leakage indicator 22 can be placed around the conduit 6 nearer the open end 12 of the condom than the securing means 14, to act as an indicator of whether any liquid inside the condom has leaked under the condom and securing means 14. The leakage indicator 22 is preferably a piece of pH paper tape (pH range 3.2–4.5), but can be any material which shows a recognizable change when exposed to liquid.

A means 16 for restraining the condom is positioned relative to the condom such that the restraining means envelopes a portion of the condom. The restraining means 16 has an open end 18 through which the condom is inserted. The restraining means 16 is made of a material that is readily virally penetrable and virally inert. Virally penetrable means that the virus can pass through the material. Virally inert means that the material does not bind or inactivate the virus. The restraining means 16 functions to restrict the hydrostatic expansion of the condom to a size approximating or corresponding to the mean anthropomorphic dimensions of a penis, while not interfering with the passage of a viral particle. The restraining means 16 can be made of open weave fabric, for example, organdy or nylon fabric. The restraining means 16 can be, for example, cylindrical in shape, 120–125 mm in circumference and 180 mm long, with one end closed.

The restraining means 16 is placed over the condom and, optionally, may be held in place by a second securing means 20. The second securing means 20 may be, for example, a rubber band. About 152 mm (6 inches) of restraining means 16 is suspended from the conduit 6 and covers the condom 4. The length of the condom 4 below the securing means 14 is about 140 mm (5.5 inches). The expansion of the condom under pressure is restricted to 152 mm (6 inches) in length.

Figure 1:
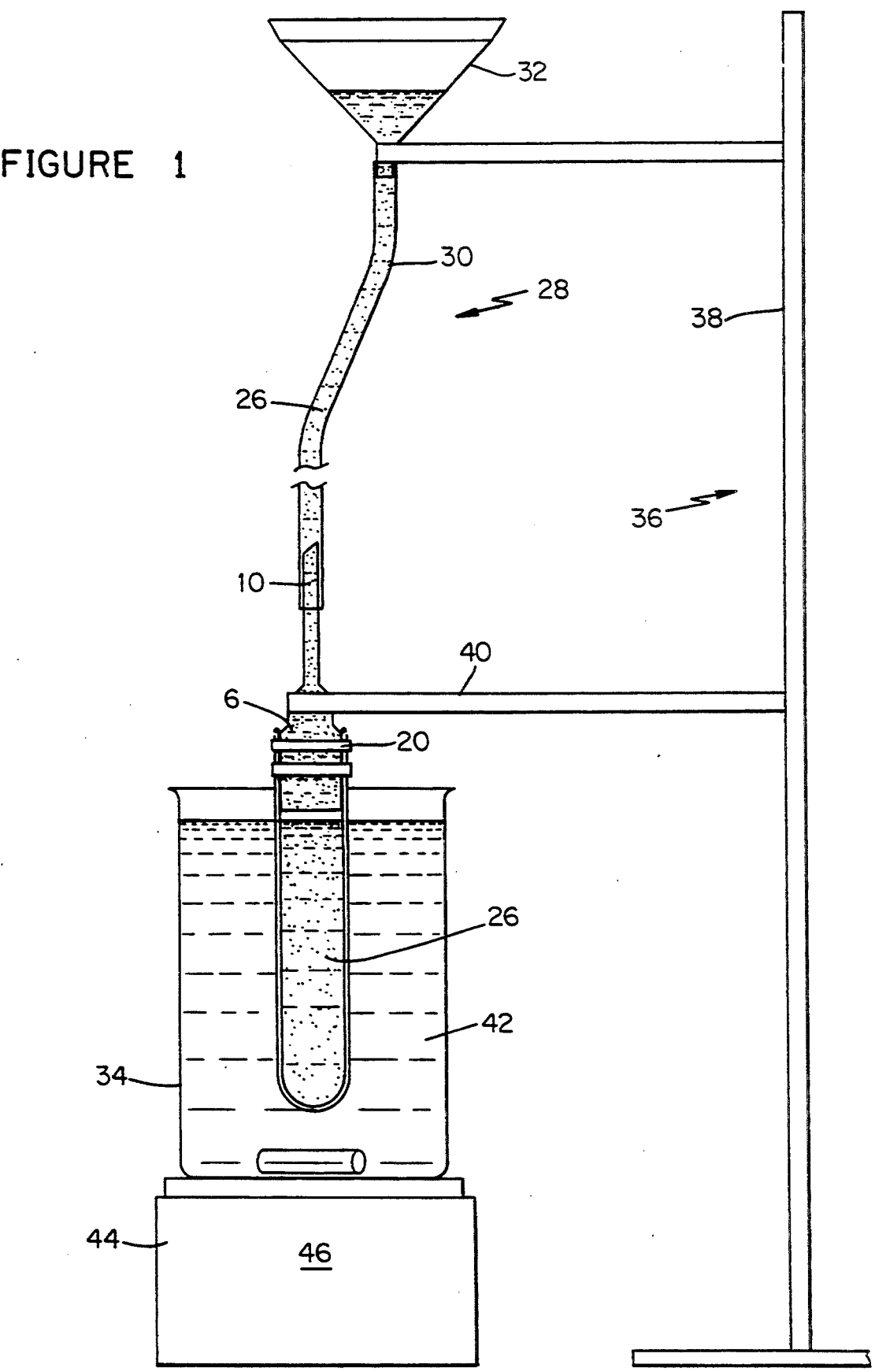
FIG. 1 is a front view of the apparatus of the invention.

In FIG. 1, a means 28 for pressurizing the fluid in the condom is connected to the second end 10 of the conduit. In the preferred embodiment, the pressurizing means 28 includes a three foot length of 6 mm (0.25 inch) inside diameter tubing 30 connecting the second end 10 of the conduit to a conical funnel 32. The materials used for the tubing and funnel are sterilizable plastic or the like. The tubing 30 is filled with the liquid 26 containing viral particles to a height of about 32 inches above the first end 8 of the conduit 6. The 32 inch column of liquid 26 equals about 60 mm Hg pressure, which is approximately the maximum pressure exerted on a condom during sexual intercourse.

Other pressurizing means 28 are also possible, for example, air pressure directly applied to the liquid 26 in the condom.

The condom is filled with a liquid 26 containing viral particles in suspension. The viral particles used in the suspension are conveniently selected from the group of viruses that are smaller than human viruses, such as the AIDS virus, which the condom is designed to contain. Exemplary of the group of smaller viruses are the bacteriophages $\phi$X174 (27 nm diameter) (ATCC #13706-B1), PRD1 (65 nm diameter), T7 (65 nm diameter) (ATCC #11303-B1,) and $\phi$6 (65 nm diameter) (ATCC #21781-B1). Studies indicate that they are excellent choices to evaluate barrier materials. See, for example, Lytle et al., "Important Factors for Testing Barrier Materials With Surrogate Viruses", *Applied and Environmental Microbiology*, September 1991, pp. 2549–2554. The $\phi$6 bacteriophage is also desirable because it has an external membrane similar to that of the AIDS virus. Additionally, the MS2 (23 nm diameter) (ATCC #15597-B1) bacteriophage is a possible choice. The viral particles can include a single type of virus or any combination of several viruses. In the preferred embodiment, the use of $\phi$X174 provides a conservative test, because lack of penetration by a small virus indicates that the condom is also a barrier to penetration by larger viruses, for example, hepatitis B virus, or the AIDS virus. More importantly, utilization of a bacterial virus allows a safer, faster, less expensive test than is possible when human viruses are used. The relevant physical properties of the $\phi$X174 virus are similar to those of pathogenic human viruses.

In addition, because an assay employing a bacterial virus requires only a few hours to perform, sterility of the test condom is unnecessary. This is because the $\phi$X174 virus grows much faster than biological contamination. The usefulness of the rapid growth characteristic of the $\phi$X174 virus has been heretofore unrecognized, to the knowledge of the inventors.

A further advantage of not having to sterilize the condom is the elimination of the possibility that the test results reflect changes in the penetrability of the condom caused by the sterilization process, for example, the effects of heat or chemical sterilization.

The liquid 26 in which the viral particles are suspended maintains the aqueous environment at "physiological" levels of salt concentration and pH. A preferred liquid is a sterile Dulbecco's phosphate buffered saline (DPBS, pH 7.0).

The conduit 6 with condom 4 and restraining means 16 attached is positioned in a container 34. The positioning of the conduit 6 may optionally be accomplished by a means 36 for positioning. The means 36 for positioning may conveniently be a clamp 40 and ring stand 38. The container 34 is made of a material capable of holding liquids, preferably a sterilizable material such as glass, polypropylene, or polycarbonate. The container 34 is conveniently a 1000 ml fleaker having its top restriction removed. A fleaker is a tall narrow beaker with a restriction at its top.

The container 34 is filled with a collection fluid 42 to collect the virus particles which penetrate the condom barrier. The collection fluid 42 is conveniently also a sterile Dulbecco's phosphate buffered saline (DPBS, pH 7.0). In the preferred embodiment, 1000 ml of the collection fluid 42 at room temperature (22°–25° C.) is contained in the container 34.

It is necessary to circulate the collection fluid 42 so that any sample drawn (that is less than all the collection fluid 42) for testing will accurately reflect the presence of viral particles. Any suitable means for stirring, mixing, or shaking the collection fluid may be used. In the preferred embodiment, a stirring means 44 includes a magnetic stirring bar 46 located in the bottom of the container 34. The magnetic stirring bar 46 is formed from a magnetic material having a plastic coating that is sterilizable.

The present invention also encompasses an apparatus in the form of a kit for testing a condom for viral penetrability. The kit includes a conduit 6 having first and second ends, the first end 8 of the conduit for receiving the open end 12 of the condom; a means 14 for securing the open end 12 of the condom over the first end 8 of the conduit; a restraining means 16 for restricting hydrostatic expansion of the condom to a size corresponding to mean anthropomorphic dimensions of a penis, the restraining means 16 having an open end 18 and being virally penetrable and virally inert; and a container 34 capable of holding liquid; the condom and the restraining means to be positioned in the container.

In the apparatus in the form of a kit, the conduit 6, means 14 for securing, restraining means 16, and container 34 have the same properties and are made of the same materials as discussed previously in regard to elements having like reference numerals.

In the kit, the liquid 26 containing viral particles in suspension is replaced by viral particles and a dried buffer powder. The dried buffer powder is mixed with water to create a solution having "physiological" levels of salt and pH equivalent to the liquid 26. The dried buffer powder may be a DPBS powder. The viral particles may be supplied in lyophilized, that is, freeze-dried form.

Rather than a collection fluid, the kit includes a dried buffer powder which, when mixed with water, results in a fluid having "physiological" levels of salt and pH. The dried buffer powder for the collection fluid may also be a DPBS powder.

Although not necessary to the kit, the kit may conveniently include a second means 20 for securing the open end of the restraining means 16 over the first end 8 of the conduit; a leakage indicator 22 to be placed between the first end of the conduit and the open end of the condom nearer to the open end of the condom than the securing means 14; a means 24 for protecting the open end of the condom, the protecting means to be placed between the open end of the condom and the means for securing; a means 28 for positioning the conduit so that the condom and the restraining means will be positioned in the container; a means 28 for pressurizing the liquid in the condom; and a means 44 for circulating the collection fluid. The properties and materials of the second means 20, leakage indicator 22, means 24 for protecting, means 28 for positioning, means 28 for pressurizing, and means 44 for circulating are the same as those for the corresponding elements having like reference numerals discussed previously.

In the preferred embodiment of the kit, the conduit is a Buchner funnel, the means for securing is at least one rubber band, the restraining means for restricting is an open weave fabric, the second means for securing is at least one rubber band, the leakage indicator is a piece of pH paper, the means for protecting is parafilm, wax paper, or plastic kitchen wrap, the dried buffer powder for the viral suspension is a sterile Dulbecco's phosphate buffered saline dried powder, the viral particles are a $\phi$X174, PRD1, MS2, T7, or $\phi$6 bacteriophage, the means for pressurizing is a piece of tubing and a funnel, the container is a fleaker, the means for positioning is a clamp and a ringstand, the dried buffer powder for the collection fluid is a sterile Dulbecco's phosphate buffered saline dried powder, and the means for circulating is a magnetic stirring bar having a sterilizable plastic coating.

EXAMPLE

The method was used to compare virus penetration through latex condoms with that through natural membrane condoms.

The liquid 26 with viral particles consisted of $\phi$X174 and PRD1 at titers in excess of $1 \times 10^7$ PFU/ml in DPBS plus 0.1% Triton X-100 (a non-ionic surfactant).

One brand of unlubricated latex condoms and two brands of natural membrane condoms were purchased from local retail stores. The inside and outside of each natural membrane condom was gently rinsed with 100 ml DPBS to remove excess lubricant.

Each condom was removed from its package and rinsed, if lubricant was present. The open end 12 of the empty condom along with a restraining means 16 was attached to a Buchner funnel and the condom/funnel assembly was clamped to a ring stand with the closed end of the condom hanging down. Via the top funnel 32, sufficient liquid 26 with viral particles (approximately 300 ml) was introduced to fill the condom and to provide a 813 mm (32 inches) column of water pressure (equivalent to 60 mm Hg) above the suspended part of the condom. The suspended portion of the condom (5.5 inches) was lowered into 1000 ml of room temperature DPBS in the container 34 which was a 1000 ml fleaker with the top restriction removed. The DPBS in the container 34 was assayed for viral infectivity at 1 and 30 minutes.

Care must be taken when the condom is filled with the viral particle liquid: (1) there should be no air bubbles in the condom assembly or the connecting tubing, and (2) virus-containing aerosol which might contaminate either the outside surface of the test condom or the fluid in the container 34 should be avoided. The DPBS in the container 34 was assayed before the filled condom was lowered into it, to assure that no viral particles were present there before the test.

During the tests with the (unlubricated) latex condoms, stained pH paper provided evidence that in 3 of 60 cases there was a low level of leakage of the viral particle liquid 26 under the rubber band seal. In one instance, the quantity of liquid 26 was sufficient to wet even the top side of the pH paper. In none of these cases did the virus assay indicate virus penetration. Thus, the double rubber band seal provided an adequate seal with latex condoms for the pressure used in this test.

The ability of this method to detect virus penetration depends directly on the titer of the challenge virus. The biological assays for these bacteriophages can detect single infectious viruses. However, in order to have 95% confidence that an assay will find at least one virus, when virus is present, that is, $P(O) \leq 0.05$, the average number of viruses per total volume assayed must be at least 3. For example, when one ml aliquots are assayed in triplicate (3 ml total volume), a titer of 1 PFU/ml (3 PFU/3 ml) will result in at least one plaque in the 3 ml total assay with 95% probability. Thus, the sensitivity of this assay is 1 PFU/ml when 3 ml are assayed. With 1,000 ml of collection buffer at 1 PFU/ml ($10^3$ total virus penetration), the assay can detect 0.1 μl challenge virus penetration when the challenge virus titer is $10^7$ PFU/ml. Higher sensitivity can be obtained with higher challenge virus titer and/or by assaying larger volumes of the collection fluid 42.

Viability of the challenge virus suspension during the duration of the test period must be assured. Viability was ascertained by comparing the initial titer to the titer from inside the condom after the 30 minute test period. The φX174 and PRD1 concentrations in the condoms remained nearly constant. The mean ratios of the challenge virus titers (from within the condoms) after the test to the pre-test titers were 1.1 ($\sigma=0.2$) for each virus with the latex condoms and with both brands of membrane condoms.

It is also necessary to assure that if viruses did penetrate the condom they would remain viable in the collection fluid. Spiking experiments were done by (1) setting up the condom test including the hydrostatic pressure on the condom, but without viruses in the challenge liquid 26, (2) adding low titers of challenge viruses to the 1,000 ml collection fluid, and (3) assaying the collection fluid at 1 and 30 minutes. The titers of both challenge viruses were not statistically different at 30 minutes from the 1 minute samples, indicating that no component of the collection side of the test would remove or inactivate any virus which might penetrate the barrier.

Virus penetration results were obtained using this method with latex and 2 brands of natural membrane condoms. The results are shown in Table 1. Three of 60 latex condoms allowed virus penetration. The apparent amount of virus penetration was calculated as the equivalent amount of challenge virus suspension needed to account for the amount of virus found in the collection flask. The virus penetration from the three latex condoms amounted to 0.1, 0.6 and 200 μl. In addition, 13 of 19 natural membrane condoms allowed virus penetration, demonstrating wide variation in the amounts of penetration (0.06 μl to >200 μl).

For optimum results, the method does require care so that (1) the condom sample is not harmed when it is attached to the test apparatus and (2) the challenge virus fluid cannot circumvent the rubber band seal. Thus, the preferred embodiment uses tests (such as the use of pH paper) to determine whether such ruinous errors of technique occur.

TABLE 1

Proportion of Condoms Which Allowed φX174 Penetration

| Condom | Number Allowing Penetration/ Number Tested |
|---|---|
| Latex | 3/60 |
| Natural Membrane | |
| Brand 1 | 5/10 |
| Brand 2 | 8/9 |

Although the apparatus and method of the present invention have been described in relation to certain preferred embodiments, numerous variations and alterations to the described embodiments are possible. The invention encompasses all such variations and alterations which come within the spirit and scope of the appended claims, and equivalents thereof.

What is claimed is:

1. An apparatus comprising:
   (A) a condom to be tested, said condom having an open end;
   (B) a conduit having a first end, said open end of said condom being placed over said first end of said conduit;
   (C) first means for securing said open end of said condom to said first end of said conduit and for sealing said open end of said condom to said conduit;
   (D) restraining means for restricting hydrostatic expansion of said condom to a size corresponding to mean anthropomorphic dimensions of a penis, said restraining means having an open end and being virally penetrable and virally inert, wherein said restraining means is positioned relative to said condom such that said restraining means envelopes a portion of said condom;
   (E) a liquid containing viral particles in suspension, said liquid filling said condom;
   (F) means for pressurizing said liquid;
   (G) a container capable of holding liquid, wherein said condom and said restraining means are removably positioned as a single unit in said container;
   (H) a collection fluid in said container for collecting said viral particles that have passed through said condom;

(I) second means for securing said open end of said restraining means to said first end of said conduit; and (J) a leakage indicator placed between said first end of said conduit and said open end of said condom nearer to said open end of said condom than said first securing means, for detecting leakage of said liquid between said open end of said condom and said first end of said conduit;

wherein said open end of said condom and said open end of said restraining means are secured to said first end of said conduit in a first position wherein said condom and said restraining means are positioned inside said container and in a second position wherein said condom and said restraining means are removed from said container.

2. The apparatus of claim 1, further comprising means for protecting said open end of said condom, wherein said protecting means is placed between said open end of said condom and said first means for securing.

3. The apparatus of claim 2, wherein said means for protecting is parafilm, wax paper, or plastic kitchen wrap.

4. The apparatus of claim 1, further comprising means for positioning said conduit so that said condom and said restraining means are positioned in said container.

5. The apparatus of claim 4, wherein said means for positioning comprises a clamp and a ringstand wherein said clamp is fixed at one end to said ringstand and at another end to said conduit.

6. The apparatus of claim 1, further comprising means for circulating said collection fluid.

7. The apparatus of claim 6, wherein said means for circulating comprises a magnetic stirring bar having a sterilizable plastic coating.

8. The apparatus of claim 1, wherein said conduit comprises a Buchner funnel.

9. The apparatus of claim 1, wherein said first means for securing comprises at least one rubber band.

10. The apparatus of claim 1, wherein said restraining means comprises an open weave fabric.

11. The apparatus of claim 10, wherein said open fabric comprises organdy fabric.

12. The apparatus of claim 10, wherein said open fabric comprises nylon fabric.

13. The apparatus of claim 1, wherein said second means for securing comprises at least one rubber band.

14. The apparatus of claim 1, wherein said leakage indicator comprises a piece of pH paper.

15. The apparatus of claim 1, wherein said liquid containing said viral particles comprises a sterile Dulbecco's phosphate buffered saline.

16. The apparatus of claim 1, wherein said viral particles comprise a $\phi$X174 bacteriophage.

17. The apparatus of claim 1, wherein said viral particles are a MS2, T7, or $\phi$6 bacteriophage.

18. The apparatus of claim 1, wherein said conduit includes a second end, said means for pressurizing comprises a piece of tubing and a funnel, and wherein one end of said tubing is connected to said second end of said conduit and the other end of said tubing is connected to said funnel.

19. The apparatus of claim 1, wherein said means for pressurizing includes means for pressurizing said liquid containing viral particles in suspension to about 60 mm Hg.

20. The apparatus of claim 1, wherein said container comprises a fleaker having its top restriction removed.

21. The apparatus of claim 1, wherein said collection fluid comprises a sterile Dulbecco's phosphate buffered saline.

22. The apparatus of claim 1, wherein the conduit, the means for pressurizing, and the container are made from a material which is heat sterilizable.

23. The apparatus of claim 22, wherein the conduit is made from one of glass, ceramic or plastic; the means for pressurizing is made from plastic; and the container is made from one of glass, polypropylene, or polycarbonate.

24. A method for testing a condom for viral penetration, comprising the steps of:

securing and sealing an open end of a condom to a conduit;

positioning said condom in a restraining means for restricting hydrostatic expansion of said condom to a size corresponding to mean anthropomorphic dimensions of a penis, said restraining means having an open end and being vitally penetrable and virally inert, wherein said restraining means is positioned relative to said condom such that said restraining means envelopes a portion of said condom;

securing said open end of said restraining means to said conduit such that said condom and said restraining means may be removably positioned as a single unit in a container;

pressurizing said condom by introducing thereinto a liquid that contains viral particles in suspension;

using a leakage indicator, detecting for leakage of said liquid between said open end of said condom and a first end of said conduit; and monitoring for passage of any viral particles through said condom into said container.

25. The method of claim 24, wherein the positioning step comprises the step of positioning said condom and said restraining means in said container which is filled with a collection fluid.

26. The method of claim 25, wherein the monitoring step comprises the step of monitoring for any viral particles at about 30 minutes after said pressurizing step.

27. The method of claim 26, wherein the monitoring step includes the steps of stirring said collection fluid and then assaying said collection fluid.

28. The method of claim 25 further comprising the step of assaying said collection fluid before performing the positioning step to assure that none of said viral particles are present in said collection fluid.

29. The method of claim 24, further comprising the step of rinsing lubricant from said condom and drying said condom before performing the positioning step.

30. The method of claim 24 , wherein the pressurizing step comprises the step of pressurizing said condom to a pressure of about 60 mm Hg.

31. An apparatus in the form of a kit for testing a condom having an open end for viral penetrability, comprising:

(A) a conduit having first and second ends, said first end of said conduit for receiving said open end of said condom;

(B) first means for securing said open end of said condom to said first end of said conduit and for sealing said open end of said condom to said conduit;

(C) restraining means for restricting hydrostatic expansion of said condom to a size corresponding to mean anthropomorphic dimensions of a penis, said restraining means having an open end and being virally penetrable and virally inert wherein when said condom and said restraining means are connected to said conduit, and said restraining means envelopes a portion of said condom;

(D) at least one viral particle;

(E) a first dried buffer powder for mixing with water and for suspending therein said at least one viral particle to form a liquid;

(F) a container capable of holding liquid, wherein said condom and said restraining means are to be removably positioned as a single unit in said container;

(G) a second dried buffer powder for mixing with water to form a collection fluid for collecting any of said at least one viral particle that have passed through said condom;

(H) second means for securing said open end of said restricting means to said first end of said conduit; and (I) a leakage indicator to be placed between said first end of said conduit and said open end of said condom nearer to said open end of said condom than said first securing means, for detecting leakage of said liquid between said open end of said condom and said first end of said conduit;

wherein said open end of said condom and said open end of said restraining means are secured to said first end of said conduit in a first position wherein said condom and said restraining means are positioned inside said container and in a second position wherein said condom and said restraining means are removed from said container.

32. The apparatus of claim 31, further comprising:
means for protecting said open end of said condom, said protecting means to be placed between said open end of said condom and said first means for securing;

means for positioning said conduit so that said condom and said restraining means will be positioned in said container; and means for pressurizing said liquid, wherein said pressurizing means is to be connected to said second end of said conduit.

33. The apparatus of claim 32, wherein said conduit comprises a Buchner funnel; said first means for securing comprises at least one rubber band; said restraining means for restricting comprises an open weave fabric; said second means for securing comprises at least one rubber band; said leakage indicator comprises a piece of pH paper; said means for protecting is parafilm, wax paper, or plastic kitchen wrap; said first dried buffer powder comprises a sterile Dulbecco's phosphate buffered saline powder; said at least one viral particle is a $\phi$X174, MS2, T7, or $\phi$6 bacteriophage; said means for pressurizing comprises a piece of tubing and a funnel, one end of said tubing is to be connected to said second end of said conduit and the other end of said tubing is to be connected to said funnel; said container comprises a fleaker having its top restriction removed; said means for positioning comprises a clamp and a ringstand wherein, when assembled, said clamp is fixed at one end to said ringstand and at another end to said conduit; and said second dried buffer powder comprises a sterile Dulbecco's phosphate buffered saline powder.

34. The apparatus of claim 31, wherein the conduit and the container are made from a material which is heat sterilizeable.

35. The apparatus of claim 34, wherein the conduit is made from one of glass, ceramic or plastic and wherein the container is made from one of glass, polypropylene, or polycarbonate.

* * * * *